United States Patent
Gardner (10) Patent No.: US 6,725,242 B2
(45) Date of Patent: Apr. 20, 2004

(54) MULTIPLE-COMPUTER DATA PROCESSING SYSTEM AND METHOD WITH TIME-VERSIONED DATA STORAGE

(75) Inventor: Paul Anton Richardson Gardner, Burnham (GB)

(73) Assignee: Fujitsu Services Limited, London (GB)

( * ) Notice: Subject to any disclaimer, the term of this patent is extended or adjusted under 35 U.S.C. 154(b) by 225 days.

(21) Appl. No.: 09/752,985

(22) Filed: Jan. 2, 2001

(65) Prior Publication Data

US 2003/0055805 A1 Mar. 20, 2003

(30) Foreign Application Priority Data

Feb. 11, 2000 (GB) .............................................. 0003021

(51) Int. Cl.$^7$ ................................................ G06F 17/30
(52) U.S. Cl. ...................................... 707/203; 707/202
(58) Field of Search ............................... 707/203, 1, 8, 707/202; 714/20; 717/170

(56) References Cited

U.S. PATENT DOCUMENTS

| | | | | |
|---|---|---|---|---|
| 5,280,612 A | * | 1/1994 | Lorie et al. ..................... | 707/8 |
| 5,412,801 A | * | 5/1995 | de Remer et al. ............. | 714/20 |
| 5,440,730 A | * | 8/1995 | Elmasri et al. ............... | 707/203 |
| 5,574,898 A | * | 11/1996 | Leblang et al. ................ | 707/1 |
| 5,586,304 A | * | 12/1996 | Stupek et al. ................ | 717/170 |
| 5,600,832 A | | 2/1997 | Eisenberg et al. .......... | 707/203 |
| 5,873,097 A | * | 2/1999 | Harris et al. ................ | 707/203 |
| 5,946,700 A | * | 8/1999 | Pongracz et al. ........... | 707/203 |
| 6,195,796 B1 | * | 2/2001 | Porter ........................ | 717/122 |

FOREIGN PATENT DOCUMENTS

| | | | | |
|---|---|---|---|---|
| EP | 994425 A2 | * | 4/2000 | ........... G06F/17/30 |
| GB | 2 343 763 A | | 5/2000 | |
| SE | WO 9841935 | * | 9/1998 | |
| WO | WO 98/41935 | | 9/1998 | |

* cited by examiner

Primary Examiner—Jean M. Corrielus
Assistant Examiner—Gwen Liang
(74) Attorney, Agent, or Firm—Barnes & Thornburg (57) ABSTRACT

A data processor comprises a number of databases for storing records and a plurality of user systems capable of accessing the databases. The user systems each include a datastore/application environment instance with which users can interface. Host systems may include more than one instance. The datastores contain time-versioned views of records. The data processor is operable in at least two modes, a normal operation mode in which an evaluation in response to a user enquiry can be carried out using records relevant to a current viewpoint time and time span, and a recovery operation mode in which records relevant to a viewpoint time and time span for a previous evaluation are accessed and used to exactly reproduce the previous evaluation.

6 Claims, 6 Drawing Sheets

| OID | StartTime | EndTime | CreateTime | Type | Surname | ... | Cost |
|---|---|---|---|---|---|---|---|
| 1234 | 1/1/1994 | 4/4/1995 | 4/4/1995 | C | Smith | | 5.4 |
| 1234 | 5/4/1995 | 6/6/1997 | 6/6/1997 | C | Jones | | 12.5 |
| 1234 | 5/4/1995 | 1/1/1996 | 8/8/1998 | D | Smith | | n/a |
| 1234 | 7/6/1997 | top | 7/6/1997 | C | Jones | | 25.6 |

| OID | StartTime | EndTime | CreateTime | Type | Surname | ... | Cost |
|---|---|---|---|---|---|---|---|
| 1234 | 1/1/1994 | top | 1/1/1994 | C | Smith | | 5.4 |

FIG 4

| OID | StartTime | EndTime | CreateTime | Type | Surname | ... | Cost |
|---|---|---|---|---|---|---|---|
| 1234 | 1/1/1994 | 4/4/1995 | 4/4/1995 | C | Smith | | 5.4 |
| 1234 | 5/4/1995 | 6/6/1997 | 6/6/1997 | C | Jones | | 12.5 |
| 1234 | 7/6/1997 | top | 7/6/1997 | C | Jones | | 25.6 |

FIG 5

| OID | StartTime | EndTime | CreateTime | Type | Surname | ... | Cost |
|---|---|---|---|---|---|---|---|
| 1234 | 1/1/1994 | 4/4/1995 | 4/4/1995 | C | Smith | | 5.4 |
| 1234 | 5/4/1995 | 6/6/1997 | 6/6/1997 | C | Jones | | 12.5 |
| 1234 | 5/4/1995 | 1/1/1996 | 8/8/1998 | D | Smith | | n/a |
| 1234 | 7/6/1997 | top | 7/6/1997 | C | Jones | | 25.6 |

FIG 6

| OID | StartTime | EndTime | CreateTime | Type | VersInfo | Surname | .. | Cost |
|---|---|---|---|---|---|---|---|---|
| 1234 | 1/1/1994 | 4/4/1995 | 4/4/1995 | C | 1:1 | Smith | | 5.4 |
| 1234 | 5/4/1995 | 6/6/1997 | 6/6/1997 | C | 2:1 | Jones | | 12.5 |
| 1234 | 5/4/1995 | 1/1/1996 | 8/8/1998 | D | 4:1 | Smith | | n/a |
| 1234 | 7/6/1997 | top | 7/6/1997 | C | 4(8/8/1998)/3:1 | Jones | | 25.6 |

FIG 7

| Time | A1 | A2 | A3 | A4 | A5 | A6 | A7 |
|------|----|----|----|----|----|----|----|
| 1 | ▤ |   |   |   |   |   | ▨ |
| 2 |   | ▨ |   |   |   |   |   |
| 3 | ▤ | ▨ | ▥ |   | ▤ | ▨ | ▨ |
| 4 | ▤ | ▨ |   | ▨ | ▤ |   |   |
| 5 | ▤ | ▨ | ▥ | ▨ | ▤ |   | ▨ |
| 6 | ▤ | ▨ | ▥ | ▨ | ▤ |   | ▨ |
| 7 |   | ▨ |   | ▨ | ▤ |   |   |
| 8 | ▤ |   |   | ▨ | ▤ |   | ▨ |

| Person | Address | OID | StartTime | EndTime | CreateTime | Type | attr |
|---|---|---|---|---|---|---|---|
| 1111 | 2222 | 4567 | 1/1/1994 | top | 1/1/1994 | C | X |

FIG 10

| OID | OccId | StartTime | EndTime | CreateTime | Type | VersInfo | Surname | ... | Cost |
|---|---|---|---|---|---|---|---|---|---|
| 1234 | 1 | 1/1/1994 | 4/4/1995 | 4/4/1995 | C | 1:1 | Smith | | 5.4 |
| 1234 | 1 | 5/4/1995 | 6/6/1997 | 6/6/1997 | C | 2:1 | Jones | | 12.5 |
| 1234 | 1 | 5/4/1995 | 1/1/1996 | 8/8/1998 | D | 4:1 | Smith | | n/a |
| 1234 | 1 | 7/6/1997 | top | 7/6/1997 | C | 4(2/1/1999)/3:1 | Jones | | 25.6 |
| 1234 | 2 | 8/9/1995 | 1/1/1999 | 8/9/1995 | C | 1:1 | Smithe | | n/a |
| 1234 | 2 | 2/1/1999 | top | 2/1/1999 | C | 2/2:1 | n/a | | n/a |

FIG 11

| 1234 | 1 | 7/6/1997 | top | 7/6/1997 | C | 2:4(2/1/1999)/3:1 | Jones | | 25.6 |

FIG 12

MULTIPLE-COMPUTER DATA PROCESSING SYSTEM AND METHOD WITH TIME-VERSIONED DATA STORAGE

BACKGROUND OF THE INVENTION

This invention relates to data processing and in particular to data storage and database management systems.

In our GB Patent Application GB 9818819.6 (C1398) (corresponding to U.S. application Ser. No. 09/354,035 filed on Jul. 15, 1999, and European Published Application Serial No. 0984369) there is disclosed a time-versioned data storage mechanism that supports the ability to view the state of the data from any selected point in time, and also permits changes to be made to past and future states not just the current state. In this prior application a single computer system with a single database was considered. The present invention is, however, concerned with multiple computer systems and one or more databases.

SUMMARY OF THE INVENTION

According to one aspect of the invention there is provided a data processing apparatus comprising one or more databases for storing respective pluralities of records and a plurality of user systems capable of accessing the one or more databases, wherein the user systems each comprise a respective datastore/application environment instance with which users may interface, wherein the datastores contain time-versioned views of records, wherein the data processing apparatus is operable in at least two modes, a normal operation mode in which records relevant to a current viewpoint time and time span are accessed and employed in an evaluation in response to a user enquiry, and a recovery operation mode in which records relevant to a viewpoint time and time span for a previous evaluation are accessed and employed to reproduce exactly the previous evaluation, and wherein the time-versioned views of records each include (a) at least one attribute;

(b) a time span indicating the time span for which the attribute is valid;

(c) a creation time indicating when the record was created, and (d) a type field indicating whether the record is a concrete record, or a delta record that possibly modifies the attribute value of a previous concrete or delta record.

According to another aspect of the invention there is provided a data processing method comprising storing respective pluralities of records in one or more databases, and permitting a user to access the one or more databases by means of a respective one of a plurality of user systems, each comprising a respective datastore/application environment instance with which users may interface, the datastores containing time-versioned views of records, wherein there are at least two modes for data processing, a normal mode in which records relevant to a current viewpoint time and time span are accessed and employed in an evaluation in response to a user enquiry, and a recovery mode in which records relevant to a viewpoint time and time span for a previous evaluation are accessed and employed to reproduce exactly the previous evaluation, and wherein the time-versioned views of the records each include (a) at least one attribute;

(b) a time span indicating the time span for which the attribute is valid;

(c) a creation time indicating when the record was created, and (d) a type field indicating whether the record is a concrete record, or a delta record that possibly modifies the attribute value of a previous concrete or delta record.

According to a further aspect of the invention there is provided an information carrier holding a program for performing a data processing method, the method comprising storing respective pluralities of records in one or more databases, and permitting a user to access the one or more databases by means of a respective one of a plurality of user systems, each comprising a respective datastore/application environment instance with which users may interface, the datastores containing time-versioned views of records, wherein there are at least two modes for data processing, a normal mode in which records relevant to a current viewpoint time and time span are accessed and employed in an evaluation in response to a user enquiry, and a recovery mode in which records relevant to a viewpoint time and a time span for a previous evaluation are accessed and employed to reproduce exactly the previous evaluation, and wherein the time-versioned view of records each include (a) at least one attribute;

(b) a time span indicating the time span for which the attribute is valid;

(c) a creation time indicating when the record was created, and (d) a type field indicating whether the record is a concrete record, or a delta record that possibly modifies the attribute value of a previous concrete or delta record.

BRIEF DESCRIPTION OF THE DRAWINGS

Embodiments of the invention will now be described with reference to the accompanying drawings, in which.

SPECIFIC DESCRIPTION OF THE PREFERRED EMBODIMENTS

Figure 1:
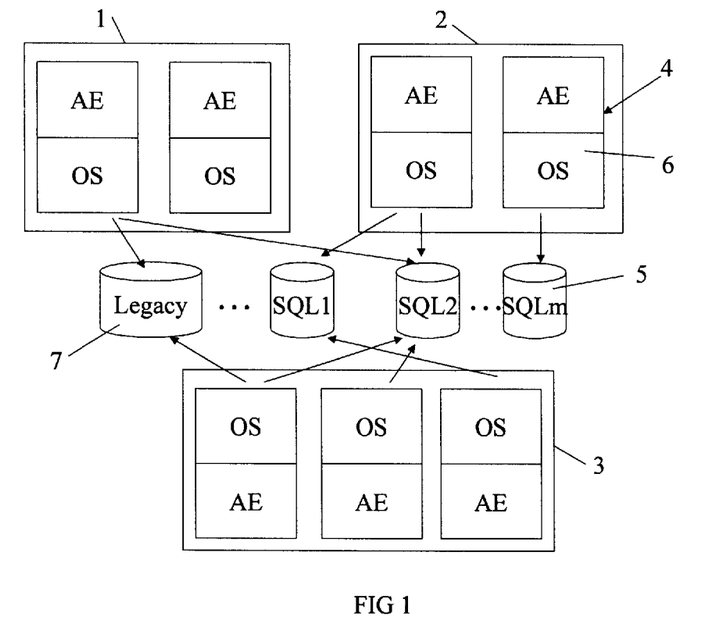
FIG. 1 illustrates, schematically, a number of separate host systems and a number of databases.

Referring firstly to FIG. 1, there is illustrated therein three separate host systems (machines) 1, 2, 3 running object store/application environment (OS/AE) software. Each host system has a number of OS/AE instances 4 which access a number of shared databases 5. The OS/AE instances comprise user systems with which users may interface. The object stores 6 each record audit trails of changes made to data (time versioning of data) that permit values to be written in the past or future, rather than just evolution of current values, as in GB 9818819.6, referred to above, the contents of which are incorporated herein by reference. The application environment is a rules specification environment, for use within a business process wherein it defines business rules, and is such as to operate on the time versioned values in a natural fashion in order to produce the past or future values. Examples of such operations are given in our GB Patent Application GB 9816301.7 (C1381) U.S. Pat. No. 6,466,930 (corresponding to U.S. application Ser. No. 09/324,214 filed on Jun. 2, 1999, and European Published Application Serial No. 0977116) and GB 9816303.3 (C1397) U.S. Pat. No. 6,374,233 (corresponding to U.S. application Ser. No. 09/324,216 filed on Jun. 2, 1999, and European Published Application Serial No. 0977115). The object stores 6 store their data in the databases 5, which may have various degrees of transaction support, from being able to enlist in distributed transactions, such as the SQL databases, to not supporting transactions at all, such as the Legacy system 7.

An object store records a time-versioned view of the state of an object by recording multiple rows keyed by a particular object identity (OID), as described in GB 9818819.6. The varying state of an object is captured by using concrete records, that record a complete snapshot of it over a specified time span, and delta records that record the difference between a concrete record and other concrete or delta records. Each record has so-called red tape consisting of start_time, end_time and creation_time.

Figure 2:
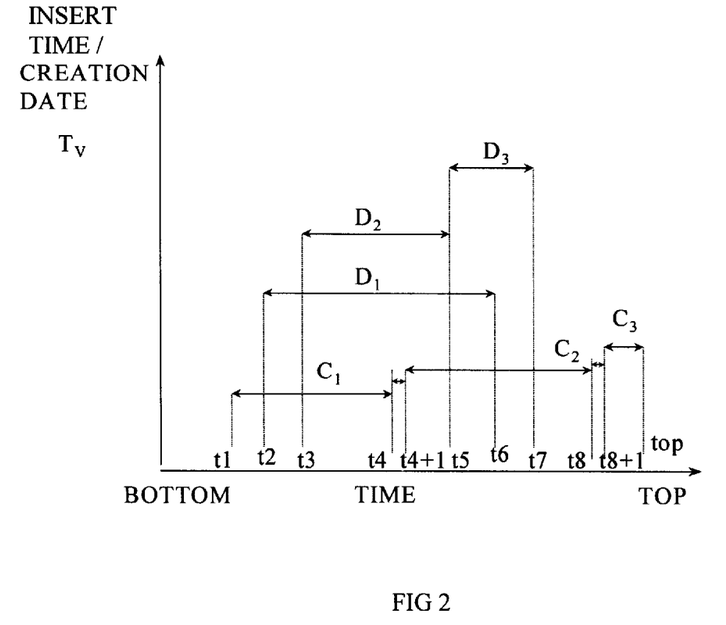
FIG. 2 is a diagram illustrating the evolution of an object's value including concrete and delta records, as a chart of insert (create) time versus elapsed time.

Evolution of an object's value results in a contiguous set of concrete records and can be visualised as such a set with delta records "over" them, as illustrated in FIG. 2 which shows an example with three concrete records $C_1$, $C_2$, $C_3$ and three delta records $D_1$, $D_2$, $D_3$. The algorithm employed to achieve this is designed such that there is always at least one concrete record, that the sole or most recent concrete record has an end-time of "top", and that there are never any delta records "above" the last concrete record, that is there is no delta record corresponding to any part of the time span of the sole or most recent concrete record. "Top" is a hypothetical maximum time (date), whereas "bottom" is a hypothetical minimum time (date).

Figures 3, 4:
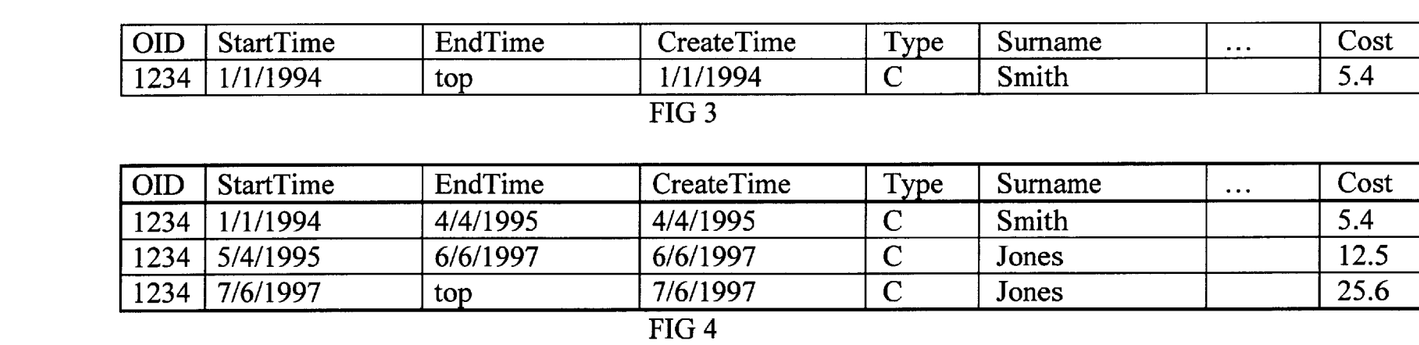
FIG. 3 is an example of a record of an object.
FIG. 4 is an example evolution of an object under normal circumstances.

Each distinct object has a unique object identifier (OID) and, in general, storage is of the form illustrated in FIG. 3. An object with an OID of 1234 is indicated as having a start time of Jan. 1, 1994, a create time of Jan. 1, 1994 and attributes of Surname (Smith) and Cost (5.4). This is a single concrete record and hence the end time is quoted as top. For ease of explanation, the start and end times of both concrete and delta records are considered herein to be inclusive. This was not the approach employed in the GB 9818819.6 example.

In order to achieve high performance of an overall system such as illustrated in FIG. 1, emphasis is placed on reducing the costs of normal activity, at the increased expense of recovery from failure situations. Normal operation of the overall system will involve multiple users and multiple transactions and thus efficiency of operation is important. Multiple users may at times require to access the same records as one another with attendant issues. Locking records within every transaction to simplify recovery from low probability events may be acceptable for a trivial application, but within the context of an online, business critical system this would no doubt be a prohibitively expensive approach.

Given the distributed nature of the OS/AE based system, emphasis will be placed on reducing actions that require synchronisation across machines, processes and databases. This means reducing or removing the need for such things as locking, clock synchronisation, cache consistency and distributed transactions.

Any dependence on clock synchronisation across host machines should be avoided, although there may be some tolerance level beyond which alerts are raised.

Whenever possible the need to lock records, or use database isolation levels, should be minimised. Here locking relates to the marking of records so that a concurrently running program will not change it.

Where a clean read is absolutely essential, mechanisms can be provided in the application environment AE to permit an application to request such behaviour. By clean read it is meant that data read for an application, which derives some outcome from it in an evaluation, is still valid data after the outcome is derived, since it is possible that the data could have been changed by someone else before the outcome was derived. Hence at the end of the application there is the need to check that the read data is still valid. Rather than locking the whole of the database for the whole of the evaluation, this can be achieved by locking the tables that were read after the evaluation, checking the values are still the same, writing the result and then releasing the locks. If the values were different, the outcome will need to be derived again before it is written and the locks released.

As to distributed transactions, wherever possible the need to co-ordinate multiple resource managers (databases) should be avoided. Where this is absolutely essential, mechanisms can be provided in the application environment to permit an application to request such behaviour.

As is apparent from the above, the software running on the host systems includes applications denoting steps in a business process. Generally the applications read a number of objects and, optionally, update a number of objects. There is only one logical commit point per application, and that is at its end. The applications thus perform well defined, and often small, units of work or evaluations.

An evaluation is performed with respect to a particular version of the associated object store, as defined by the viewpoint time, and is also performed over a particular time period called the target time period [target_start, target_end]([ts,te]). Normally this will be a single point in time [t,t], but it is not so limited.

Due to lack of clock synchronisation there is a strong concept of relative time within an evaluation. That is, whilst a given object store can define its own absolute local view of the current time, this is not particularly useful. It is more useful to define a relative time which denotes a suitable value relative to a particular absolute value. For example:

relative(now)

gives a value that can be used in an evaluation to denote some globally consistent current time. Thus relative(Jan. 1, 1996)

gives a value that would have denoted a globally consistent time of Jan. 1, 1996. This is not the same as specifying an absolute value.

A viewpoint of relative(now) thus denotes the most recent versions of the object store. After an evaluation has completed, a relative time can be interrogated to find what absolute time can be safely used in its place for a repeat evaluation, see below. It is not meaningful to have relative time(s) for the target period and an absolute time for the viewpoint.

In order to provide the high performance required for normal operation (optimisation) and yet still be able to perform recovery and other operations adequately, as will be apparent from the following, four distinct modes of application evaluation are defined.

There is a current mode, which is an evaluation based on the current view of the object store. As current view can vary across object store instances, this is not an absolute time, rather it is the most recent values of objects. This is the normal application mode.

ViewpointTime=relative(now)

TargetTime=chosen target time [ts,te]

The target time is most likely to be [relative(now), relative (now)] used to denote the global current time point.

Another mode is the exact mode, which is used in a recovery situation, which should only occur rarely. An exact evaluation is one which runs against a fixed version of the object store, that is, the versions of all of the objects are explicably stated. This mode can be used to exactly reproduce the results of an earlier evaluation.

ViewpointTime=specified separately for each object

TargetTime=previous evaluation target time span

In this mode all times are absolute.

A further mode is the speculative mode. This mode is used to try an evaluation at an arbitrary point in time to see what the results would have been if it had been done then.

ViewpointTime=a point in time

TargetTime=a span in time

In order to faithfully reproduce the behaviour that would have been generated with clock-skew between object store instances, it is necessary to run this mode with relative times as required, and a maximum clock skew parameter. This is effectively added to the Viewpoint time during rerunning to see if values slightly in the future of the required Viewpoint exist.

For example,

ViewpointTime=relative(Jan. 1, 1996)

TargetTime=[relative(Dec. 25, 1995), relative(Jan. 1, 1996)]

The fourth mode is the review mode. This is used to see what impact a change would have had on previous evaluation. For example, if it was discovered, after an evaluation was performed, that the facts used were wrong, then they can be corrected and the evaluation rerun, to see what difference, if any, this would have made.

ViewpointTime=relative(now)(probably)

Target Time=previous evaluation target time

Viewpoint needs to have a value that encompasses the change under consideration. If it is not relative (now), then maximum clock skew is required, as above. The Target time must be the absolute start and end times that were in force at the end of the evaluation under review.

Under normal circumstances, there is carried out a normal evaluation and the current evaluation mode is employed. Normal circumstances involve the evolution of the object state with the validity of information being from "time of discovery onwards". This results in a set of contiguous concrete records capturing the complete state of the object in one record at any given time. Reads of object state are normally for the current value. FIG. 4 illustrates an example evolution of an object under normal circumstances. All of the involved algorithms are optimised for what are considered to be these normal circumstances. The downside of this is that recovery can be more complex. Optimisation is for performance rather than, say, storage utilisation.

When multiple machines are involved in a system, as illustrated in FIG. 1 for example, it is not possible to absolutely synchronize their clocks. It is, however, reasonable to assume that their clocks can be kept within some tolerance of each other by use of a time service. The main problem caused by this lack of synchronization is due to the impact of this on time versions.

If each object store instance assumed exact synchronization, then the following can occur. Say object store A is running T ahead of object store B. Object store A writes a value for some object, O, with insertion time IA. Object store B then reads the same object at time RB, with RB<IA due to the time difference. This read will not see the value written by object store A, as it is in object store B's future.

The solution to this is based on the various modes that an application can be run in and involves slight modification to relative time values to encompass such future values, as follows:

If the Viewpoint time is absolute, then the Target time must be absolute as well. No special processing is required. Otherwise:

Object store local current time is obtained and stored as local_start_time local_start_time=local_time(now)

Relative times are then converted into absolute times as follows:

For Viewpoint
   relative(now)→abs_vp=top
      max_vp=local_start_time
   relative(other)→abs_vp=local_time(other)+max_skew
      max_vp=local_time(other)

For Target time span [ts,te], for each ts, te:
   relative(now)→abs_t[s/e]=local_start_time
   relative(other)→abs_t[s/e]=local_time(other)
   absolute(x)→abs_t[s/e]=local_time (x)

From here on the absolute values are used. The absolute viewpoint, abs_vp, does not vary throughout processing. The other values, max_vp, abs_ts and abs_te can be moved forward in time.

On each read of an object from the object store, the creation time of the latest version that affects the values returned (LVT) is returned to the application environment. Further details of this version information are given hereinafter. This is used to decide whether to move time forward and whether to rerun the evaluation.

```
// outer complete evaluation loop
boolean rerun_required    = true
while(rerun_required){
    rerun_required = false
        // evaluation instance start point. Target span
        // is [abs_ts, abs_te]
    if
        abs_ts > abs_te
    then
            // oops! a relative ts has 'caught up with'
            // an absolute te
        abandon( )
    endif
    while(work_to_do){
        ...
            // the evaluation needs to read an object. . .
        time LVT = readObject(
                vp = abs_vp, ts = abs_ts, te = abs_te)
            // note LVT always <= abs_vp
```

```
            // and max_vp always <= abs_vp
        if
            LVT > max_vp
        then
            time skew = LVT - max_vp
            max_vp      = LVT
            if
                ts was relative
            then
                abs_ts = abs_ts + skew
                rerun_required = true
            endif
            if
                te was relative
            then
                abs_te = abs_te + skew
                rerun_required = true
            endif
        endif
        if
            rerun_required
        then
            break
        endif
    endwhile
endwhile
```

The above algorithm deals with synchronization problems and specific object instances. There is, however, a different problem involved with group membership. There are two cases where this occurs. Firstly, when performing a "locate" operation to find a set of objects. Secondly, when expanding a 1-many relationship to find the member instances. In both cases it is possible for a different object store with a slower clock to create new instances of objects such that, if the operations were naively rerun in "exact" mode, with a Viewpoint time set to that of the end of the evaluation, a different set of results could be returned, breaking "exact" semantics.

The solution is to keep track of other object store instance activity so as to be able to rule out such skewed insertions. This is done by giving each object store instance a separate identity and logging this against its updates. Thus at any time the object store-relative latest time that has influenced the results is known. If this is more than the maximum clock skew before the current Viewpoint, then it cannot have any untoward effect on the evaluation. However, if it is not, then it might have such an effect and the evaluation will need to be rerun.

In more detail:

Create an empty set of known other object stores, OS_LVTS{}. This will hold a mapping between object store identifiers (OSID) and the latest LVTs for the object store.

The evaluation loop then proceeds as above with the object store reading objects. Every time the object store performs a locate or relationship expansion it retrieves a set, S, of objects.

```
for (each Object O in S){
    get O's latest version LVT and its OSID
    if (LVT > max_vp - max_skew){
        if
            OSID is not in OS_LVTS
        then
            add (OSID->LVT) to OS_LVTS
            rerun = true
        else
            if
                existing LVT for OSID < this LVT
            then
                replace existing with new LVT
                rerun = true
            endif
        endif
    endif
}
if
    rerun
then
    restart evaluation BUT retain OS_LVTS as it is
    also keep max_vp etc as it is.
endif
```

At the end of the evaluation, the set contains the object store-specific viewpoints that must be used to trim the list of objects encountered. This must be stored for use with a rerun mode.

During an exact rerun, any LVTs retrieved during a locate/relationship expansion that are less than the max_skew behind max_vp, and either do not exist in the OS_LVTS or have an LVT> the corresponding entry, are ignored.

Note that it is essential that the object store returns objects within a set in the same order.

As to locking, the aim is to minimise the need for it under normal circumstances. As an object's state can consist of multiple database records, the problem is to ensure that the consistency of these sets is maintained. Thus, for example, when reading an object, care needs to be taken that all records are retrieved, not some subset. Likewise, during update it is necessary to ensure that parallel activities do not lead to inconsistency.

The solution described below completely avoids any database read locks or isolation levels and requires only a single record to be locked for update.

With regard to update, it should first be recalled that all objects are guaranteed to have a concrete record that stretches to "top", and in addition that as the object evolves, the concrete records form a contiguous chain of values, with the last one running to "top" and all previous ones having adjacent end/start times. See FIG. 4. In particular, when a record that runs to "top" ceases to apply, its end time is modified to be the requisite value.

It is this concrete record that is chosen as the distinguished record for update locking. Under normal circumstances it is updated anyway as the concrete values evolve. However, it is important that the lock covers arbitrary evolution, such as that caused by addition of pure delta records. An additional attribute is thus added to the record to record the latest version number of the object. This helps a later part of the algorithm and as a side effect ensures that this locking record is always updated.

As to reading, the problem with using no isolation levels/locking is that it is possible when reading an object that only a partial set of records will be retrieved for it. This can occur if, while during the read, another activity updates the object, with the result that multiple records are written. For example, consider an implementation of a relational database that performs a search by serial scan and inserts records randomly. If some of these records inserted are "before" the current read point and some are "after", the read would only pick up the "after" ones.

The solution is to record details of object version and the number of records in a version within each record. This allows the detection of a situation where records might have been missed. The "object version" is maintained in the lock record and is simply a consecutive sequence of integers.

Figure 5:
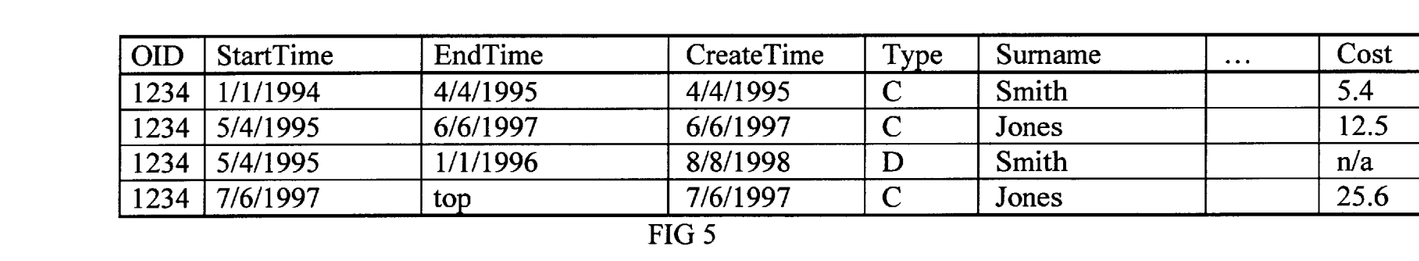
FIG. 5 is an example of the object of FIG. 4 after further evolution.
Figure 6:
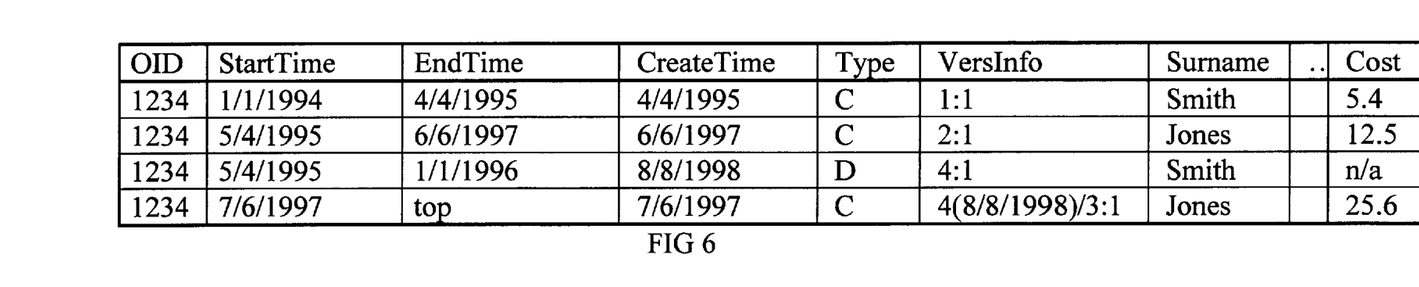
FIG. 6 is the example of FIG. 5 with additional information stored.

Assuming an example evolution of an object which involves a delta record as illustrated in FIG. 5, when version information is included it becomes as illustrated in FIG. 6. In FIG. 6, the "VersInfo" attribute records version information in the following format:

highest_version (version_time)/this_version: records_in_version

The "highest_version" marker only has meaning in the lock record, that is the "concrete" record that goes to "top". In the example, this is "4".

The "version_time" marker gives the creation time for the highest version, and again this only has meaning in the lock record. It is required for the clock skew defence detailed above.

The "this_version" marker gives the version of the object that the record was created for. Hence in the example, the delta record is the highest. Whilst the CreateTime attribute is somewhat similar to this, it cannot be used to spot completely missing versions as it is merely an increasing time stamp.

The "records_in_version" marker says how many actual records belong to this version. All records written within a version have an identical value for "VersInfo", that is there is no record "i of j" marker.

This information is used during a read as follows. Consider a read over span [ts,te] from viewpoint time tv. What is retrieved is all records with (CreateTime<=tv and
EndTime>=ts and
StartTime<=te
)
or
(Type=Concrete and
EndTime =top
)

Under normal circumstances, the first part of the "or" statement will also retrieve the lock record, thus making the second part null.

Examination of the retrieved concrete records will reveal the range of object versions that can affect this time period. The (timewise) first concrete record's record defines the starting version (vs), and the lock record, that is the last one, contains the end version (ve) in the "highest version" field. To see why it is not necessary to consider versions prior to "vs", recall that at the time that "vs" was created it was the lock record. Thus there can have been no deltas created by previous versions that could have been "above" it. Hence, any changes made to the values it denotes, must have been made in future versions. If any of the retrieved records have a version>"ve", then the read is invalid.

Otherwise a check is made that all records that should occur in versions "vs" to "ve" have been retrieved. If any are missing, then the read is invalid. Note that, in general, all such records will not have been found. However, under the normal circumstances, they will have been found, and this is what the optimisation is aimed at.

If the above tests have deemed that the read has failed, then the read is repeated, but this time using either a lock on the lock record or database isolation levels to ensure that a parallel update does not produce a partial record set.

Lookup will now be considered. Lookup of objects by attribute value is normally performed by a straightforward SQL statement detailing the required constraint, for example:

Select*from Person where Surname='Smith'

The problem is that, in general, this retrieves a subset of the records of an object, and hence will find things that it should not.

Consider the evolution of FIG. 5 again. This shows that on Aug. 8, 1998, it was found that the Object's 'Surname' attribute should not have been changed to 'Jones' on May 14, 1995, rather it should have been on Feb. 1, 1996.

If a search is performed to find all the Jones' known to the system on, say, Oct. 10, 1995, then this will find the second record and make it look as if OID 1234 should be included in the objects found. Only on a full read of the object, and re-application of the search criteria in the light of the delta record, will it become apparent that the object does not match the search criteria.

Note also that compound selection criteria cannot be handled with this approach, as the values for attributes can be spread across multiple records. For example:

select*from Person
where
Surname='Smith' and Cost=12.5 at time Oct. 10, 1995, this will not find any records, even though between May 4, 1995 and Jan. 1, 1996 this was true.

Hence, there are two problems: the first is an over-enthusiasm problem, namely the finding of objects that should not have been found. The second is the opposite, the complete missing of effectively matching search criteria. In general the problems can only be solved by a re-query, but the aim is to prevent this under normal circumstances. The first problem will be considered in further detail after consideration of compound searches, namely the problem of supporting searches based on more than one attribute. It should be noted that the issue does not arise when the object is keyed on a single attribute.

One possible solution to the compound searches problem is referred to as fill out deltas. This approach ensures that delta records always have a complete set of attribute values for those that can be used in a search.

Whenever a delta record is about to be written that includes one or more keyed attributes, say a1 ... ai over time period [ts,te], the remaining keyed attributes, say aj ... an, must have their existing values over [ts,te] examined. If these values do not vary, then a single delta can be written containing the modified a1 ... ai and the existing aj ... an. If they do vary, then multiple delta records must be written. The number required corresponds to the number of unique points in time where a value changes, each capturing a slice of consistent values.

Figure 7:
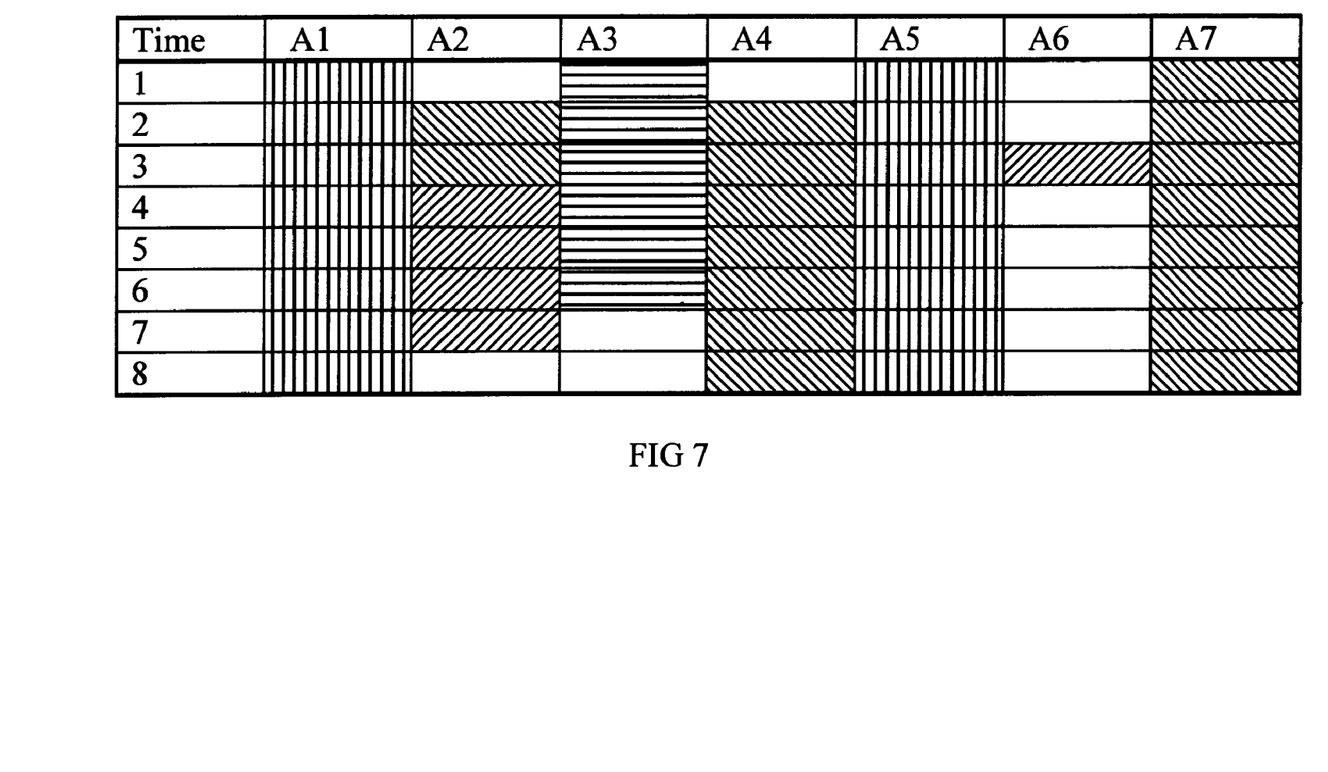
FIG. 7 illustrates a set of delta records.

For example, consider the table in FIG. 7 that shows an abstract view of attribute value variance. The different cross-hatching patterns correspond to different values. All of the attributes, A1 to A7, denote keyed attributes. A1 and A5 are values that need to be written due to the actual modification. If they have been put in the same delta, then by definition they have the same time span, in this case [1,8]. The remaining attributes have their existing values.

The time points at which values vary are

Figure 8:
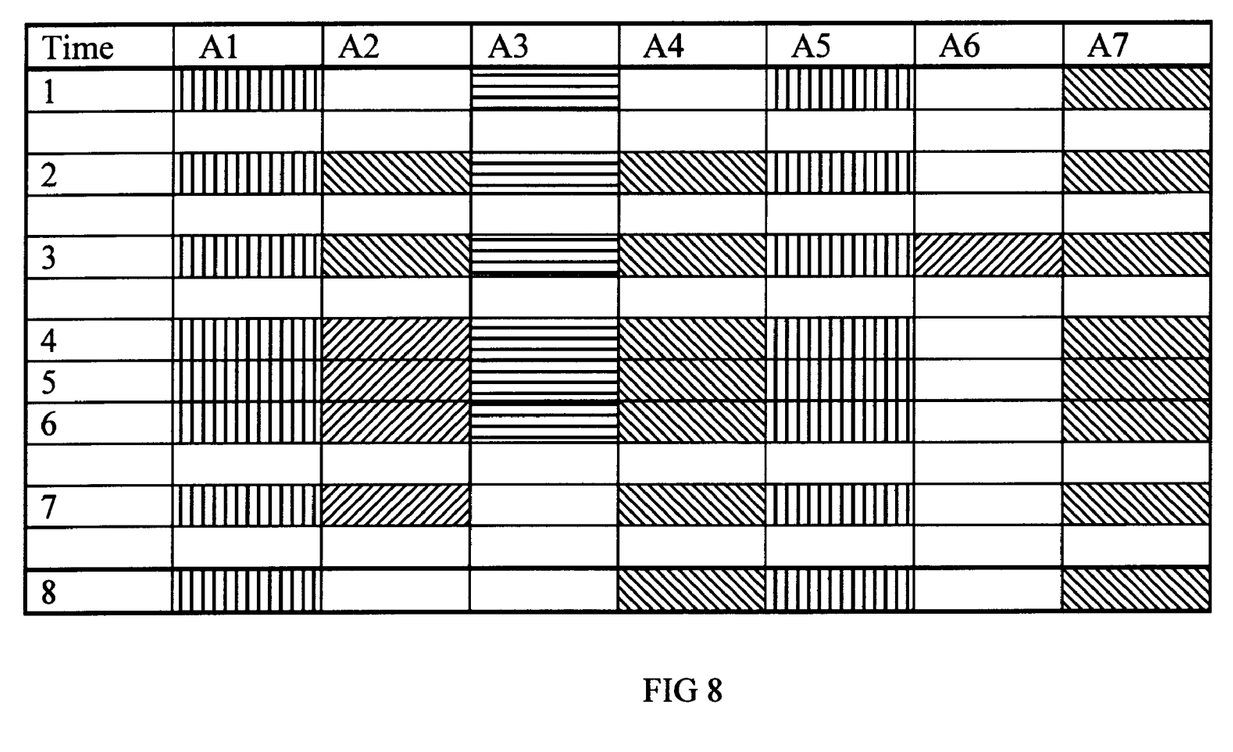
FIG. 8 illustrates the set of delta records of FIG. 7 after a filling-out process.

A2: 1, 2, 4, 8
A3: 1, 7
A4: 1, 2
A6: 1, 3, 4
A7: 1 which gives the unique points as 1, 2, 3, 4, 7, 8 resulting in six separate delta records, as illustrated in FIG. 8, one delta record encompassing 3 time periods (4,5,6).

The advantage of this is that the original search is unmodified and thus is performant. The disadvantage is that store requirements are increased and update time is affected for deltas, particularly when the "filling out" results in the creation of multiple delta records, especially as all attributes are indexed.

It should also be noted that the definition of which attributes are keyed, physically affects the recorded records. Thus, if this needs to be redefined, the existing values will not be present to support searching under the new keys, that is a database re-index is insufficient. If support for such retrospective searching is required, it is necessary to either modify existing deltas as required or accept a decomposed search, as below.

In the latter case the search is decomposed into a disjunction that can be handled by the database and the compounding is performed at the object store level. Thus Surname='Smith' and DateOfBirth=Dec. 12, 1996 becomes

Surname='Smith' or DateOfBirth=Dec. 12, 1996 and the object store has then to apply the query as required to the resulting records. This functionality is also required to solve the over-enthusiasm problem referred to above. The advantage of the decomposing approach is that it does not require any physical changes to representation. The disadvantage is that it can result in very poor performance.

Returning to the over-enthusiasm problem, and the aim of preventing a re-query under normal circumstances, assuming that the compound query problem has been solved by filling-out or decomposing the search, then a query will result in a set of records that match the constraint. The object identifiers held within these are a superset of those required, the job is to remove those that are not.

In normal circumstances there is only one record under consideration, namely the concrete one that runs to "top". By definition this cannot have any delta records that modify it, and hence no re-query is required.

The simple solution for the remaining records is to perform a query on each of the objects in turn, to obtain the correct time-based view of the attributes being searched on. Given this, the object store must then "manually" reapply the query constraint to see if it is indeed satisfied, removing the object from the result set if it is not.

One optimisation can be applied if searches are typically scoped from the past. Concrete records can have a marker included in them that indicates whether or not one or more delta records are known to exist that cover the time span that the concrete record denotes. Given that the insertion of delta records is anticipated to be a rare event, the writing of this marker does not imply significant overhead. If such markers are used, it will be apparent that no re-query will be required for an object consisting of unmarked records. Rather, a re-query must be done if a concrete record is returned with the marker set, or any delta records are returned. If record archiving is being used, then the marker for restored records must be set appropriately. Archiving results in records with a "creation time" and an "end time" less than an "archive time", being moved to off-line storage. Delta records can still be written that cover an archived period, but the assumption is that the archive is read-only and that the archived concrete records would not be updateable. Hence on "restore" they need to be modified as required.

A facility provided by the object-store/application environment software is such that updates across the databases can be reliably performed in the absence of coordinated transactions, provided isolation is not required. By "reliable" is meant that once the decision is taken to commit a set of updates, the software will ensure that they eventually occur. The caveat regarding isolation is an inevitable effect of not using full transactional co-ordination. However, recovery from potential problems caused by lack of isolation can be handled due to the time versioned object store.

As mentioned, an application denoting steps in a business process reads a set of objects and, optionally, updates a set of objects. The updated set can be split by the application designer into sets of objects that must be coordinated (for example, a debit/credit activity) and those for which such absolute co-ordination and isolation is not mandated. Each such set is called an Atomic Unit (AU).

Consider a set of updated objects:

{O1, O2, ... On}

Assume that these are then partitioned into a number of AUs and a remainder:

A1{O2,O4}, A2{Oi, ... Oj}, ... Am{Op,Oq}

{O1,O3, ... On}

The OS will ensure that the AUs intentions are obeyed but it is free to organise activity across such AUs. Specifically it can 1) decide the ordering of the units or perform them in parallel
2) extend units with extra objects
3) merge units
4) create new units So, for example, it could transform the above example into:

A1{O1,O2,O4}, A2{Oi, ... Oj,Op,Oq}

A3{O3, ... }

{On}

An extreme example of this is to put all objects into a single unit. The algorithm that the OS uses to perform this repartitioning is based on the OS knowledge of which physical databases support which objects and their characteristics. The only transformation that cannot be performed is the splitting up of objects within a unit such that they fall into separate units, as this violates the grouping requirements.

In general the OS will group updates to minimise the number of physical database transactions and distributed transactions. This can be achieved by applying the following basic algorithm.

Starting point is a set of AUs and a remainder set, NonAUs{ ... }.

Examine all objects that are not on a transactable database. If any of these are in an AU then the required semantics cannot be supported and the whole evaluation aborts. Otherwise they are removed into a set NonTrans{ ... }.

Likewise, all objects that are on transactable databases that cannot partake in distributed transactions are examined. If any of these fall into an AU then, if that AU does not solely consist of objects on the same physical database the whole evaluation aborts. Otherwise they are removed into a set NonDisTrans{ ... }.

There are now the following: AUs, NonAUs{ ... }, NonTrans{ ... } and NonDisTrans{ ... };

Each AU has its objects examined to find the physical database it resides on. The unique DBs are identified. This results in a mapping:

Ai->{D1, . . . Dn}

If any Ak's map is a subset of Aj's map then Ak's objects are merged into Aj.

If there is only one set left then this phase is complete.

Otherwise further merging depends on the cost of a distributed transaction as opposed to the cost of enrolling in one. That is, for example, is it cheaper to create two separate distributed transactions for {D1,D2, . . . } and {D3,D4, . . . } or cheaper to use just one {D1,D2, D3,D4, . . . }. Three approaches are defined here, although there are obviously many extensions:

1) leave the groups as they are. There the assumption is that the cost of a distributed transaction is low and that it is cheaper to enlist the same database in multiple distributed transactions than to increase the number of databases enrolled in one. This is the most unlikely situation.

2) Apply an algorithm to merge groups based on common databases occurring in different groups. For example, {D1,D2} and {D1,D3} merge to {D1,D2, D3}. The aim is to reduce the number of distributed transactions but minimise un-necessary coupling.

3) merge all the groups into a single distributed transaction. The assumption here is that the cost of a distributed transaction is high and the cost of enrolment low. This is the most straightforward approach.

At the end of this merging process there will be a number of AUs, each mapping to 1 or more databases. All objects from the NonAUs set that map onto a physical database occurring in an AU are moved into that AU.

The objects remaining in NonAUs and those in the NonDisTrans set are considered together and split into new AUs based on their physical database.

An AU that consists of objects mapping to a single physical database can be committed using a non-distributed transaction. Those mapping to multiple ones are committed using a distributed one as required. All the objects within the NonTrans set are committed individually.

If new objects are being created, and they can be placed on more than one database, then unless there is a strong allocation policy it is possible to place them on a database that is already being updated due to another reason. Likewise, if multiple objects are being created and there are options for placement, it can be possible to co-locate them to reduce the number of (distributed) transactions.

Preparations for update will now be considered. The following concerns transactable objects. Non-transactable objects are dealt with separately hereinafter.

The discussions above cover how to read and locate objects without using locks, and how to segment the resulting updates into atomic units. However, before an update can be made, checks are required to ensure that objects have not changed since they have been read. For objects being updated, this is essential. For objects that have been read, this is optional.

To support recovery it is necessary to store the final viewpoint and target times used. These are stored in an instance of a "session" object. Each such session object is also linked to an object that denotes the object store/application environment instance, so that on recovery it is possible to identify which were the last sessions that a given object store/application environment instance was working on.

In order to be able to easily identify the updates that have been made, all new versions of objects created by a session have an identical creation time. This is defined to be commit_time=maximum(max_creation_time+1,
  local time(now_at_commit_point))

That is, the maximum of the maximum creation time encountered during object reads, each read guarantees access to the lock record that contains this value, and that of the local time just prior to performing updates.

This value is also recorded in the session object, although it is implicit in the creation time of the session object.

The session object is added to the most appropriate AU (one already containing the session object's physical database), or a new one is created if no such unit exists. If there are more than one AU in existence after doing this, then it is essential that the AUs are ordered, such that the one containing the session object commits before any of the others.

In order to support the "exact" mode of evaluation, it is necessary to record accurate details of all the objects that have been read, on top of the general evaluation parameters detailed above.

Figure 9:
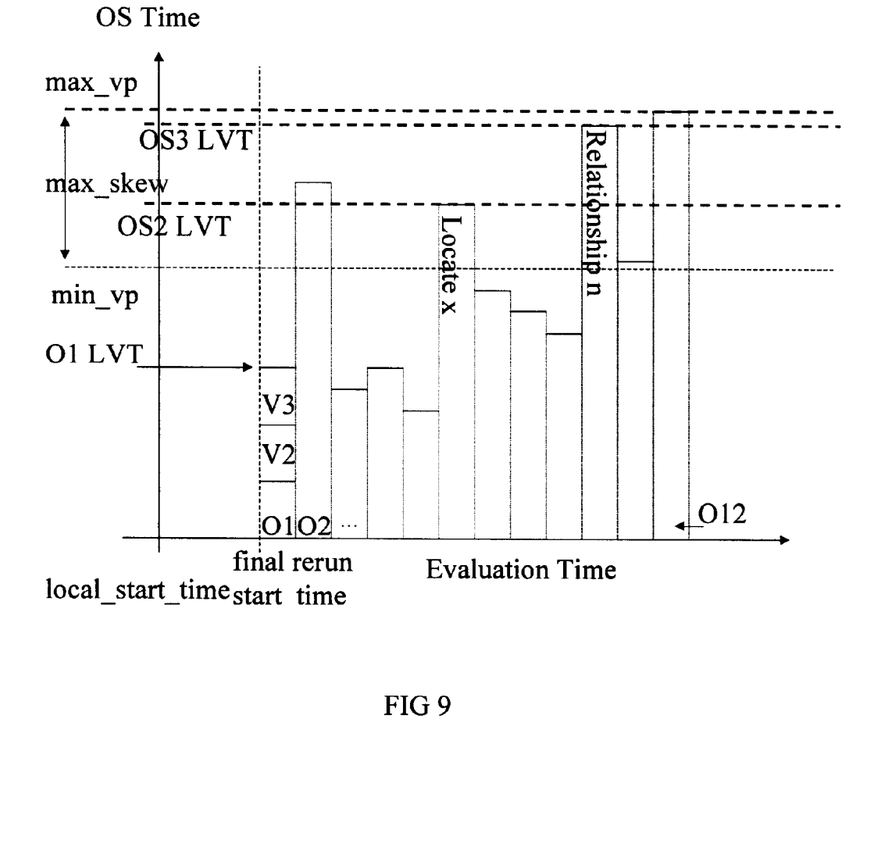
FIG. 9 illustrates a graph of objects used within an evaluation.

It is useful to picture a graph of objects that have been used within an evaluation (objects read and located). FIG. 9 is a graph of object store time against evaluation time. It shows an original "local_start_time"and the period between that and the "final_rerun start_time" that is used in performing reruns, in the case illustrated because object O12 was encountered. Object O1 is shown with three versions, as an example. O6 is an object found by a "locate" having been written by an object store OS2. Similarly, O10 is an object written by an object store OS3 and found during relationship expansion.

Sufficient information needs to be recorded to ensure that exactly the same objects are used during a rerun. As mentioned earlier, this includes max_vp and the final start and end target times. This gives the outer parameters of the evaluation but does not in itself exclude modifications that have been made by other object stores with slow clocks. For example, an object store OS4 could have written a version V4 for object O1 after it was read by object store OS1 and with an insertion time less than max_vp. To handle these it is necessary to store information about individual objects.

For the following discussion consider "min_vp" to equal (max_vp—max_skew).

It should first be noted that any objects with an LVT less than mim_vp can have their precise version re-assessed by using a VP of min_vp. By definition, no writes can occur in the period prior to min_vp by any object store instance. Thus none of these objects need their identity or LVT recording, although identity is useful for dependency tracking as discussed below.

The remaining objects are those that fall in the min_vp to max_vp period. Here the precise version used has to be recorded, thus OID/LVT is stored.

On top of this it is necessary to exclude new objects, as opposed to new versions of existing objects, by storing the OSID/LVT map and applying this when re-running to discard such new objects. This consists of the set {OS2/O6-LVT, OS3/O10-LVT} in the above example. Thus, for example, if OS2 created a new object that matched the O6 locate criteria at a time between OS2/O6-LVT and max_vp, it would be discarded. Changes to the result set from a "locate" can also occur due to an OS amending the values of keyed attributes during the skew period, objects can be added or removed from the original set. For example, in the above assume that the "locate" that found O6 was of the form "Person.Surname='Smith'". If OS2 changed an existing object's Surname (say O34) from "Smithe" to "Smith" between OS2/O6-LVT and max_vp then this object would now also be located. Again, the same approach is used to discard such modifications—the version of O34 located will have an OS2/O34-LVT which is more recent than the recorded one and hence the version must be ignored. In general all of these "spurious" versions are discarded and, if one or more versions remain (which will not be the case for objects created in the period, for example), the "locate" operation is re-applied against the more recent remaining version, hence ensuring that the versions of objects against which the "locate" are performed are the same as in the original evaluation.

The identities of all written objects are recorded. Note that it is not necessary to record individual version creation times for these as they all have the same value, namely that recorded for "commit_time".

Relationships will now be considered. n-ary relationships are denoted by first class objects and are, by default, many-many(+). As a collection, they have differing identity depending on which end they are traversed from. Consider a Person-LocatedAt-Address binary many-many relationship (a person can be located at many addresses, many different people can live at a given address). Linkage is performed by having pointers from the relationship object to the participants. In the above example there is a pointer from the "LocatedAt" object to a Person and to an Address. That is, there are no forward pointers.

Thus when navigating from a Person to their addresses, a search is made on the "LocatedAt" table for pointers to the person. When navigating the other way, the search is made for pointers to the address. Hence a given relationship has, in the sense of membership, multiple identities, each of which can be impacted by a modification to a single relationship instance.

Figure 10:
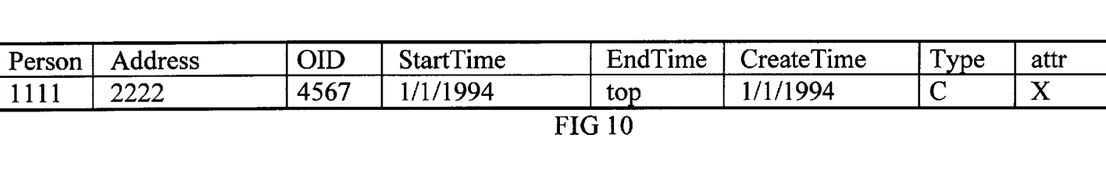
FIG. 10 is another example of a record of an object.

For example, the record indicated in FIG. 10, shows an instance of a relationship between Person '1111' and Address '2222'. This relationship has identity '4567'.

Membership of the relationship as a whole can be impacted by change to this record, or addition of new instances related to either Person '1111' or Address '2222'. It is thus necessary to record sufficient information to spot when this happens.

The information recorded thus consists of the OID of the instance accessed, as for any other object, plus details of the relationship(s) traversed. For example, if an evaluation traversed from person 1111 to this record, it would be necessary to record "LocatedAt/Person=1111". However, if the evaluation then went on to traverse to Address 2222 and then back to this one, it would also be necessary to record "LocatedAt/Address=2222". The LVT for such a traversal is recorded as being the viewpoint time used to perform the traversal.

On update, when a new relationship instance is created, then it is necessary to record the traversals that this denoted. Creating a LocatedAt instance with a Person pointer of 4444 and an Address pointer of 5555, requires the writing of "LocatedAt/Person=4444" and "LocatedAt/Address=5555". Likewise, if an existing instance has its pointers modified (note that the only possible modification that can be made to a pointer is to delete it, it can never be set to another value, for reasons not detailed here), then again the relevant record must be made. For example, if in the above example the pointer to Person 1111 was deleted, it is necessary to record LocatedAt/Person=1111.

There are many sorts of other "external" information that also needs to be captured, so-called environmental information. These range from the security attributes of a client that are made visible, to rule evaluation and to values supplied by the user for unbound variables. Again, all of these are stored in the session object.

A further consideration is that for created objects/relationships. It is possible for an evaluation to generate a number of new objects to be inserted into the object store, be they new objects or new relationship instances. If a subset of these are successfully committed before a failure occurs then, on recovery, it is necessary to write the objects that failed. In order for the recovery process to be able to identify which writes have failed, it is necessary for an evaluation to deterministically label such objects. This labelling is then also recorded in the session object. Recovery can then use this labelling to derive the set of missing objects.

For example, consider an evaluation that created two People, OID 1234 and OID 5678. Without labelling, it would just be these OIDs that were recorded. On recovery, the evaluation would be rerun and produce two people again, with say OID 4321 and OID 8765. It will not generate identical OIDs as they are supposed to be globally unique and arranging for the re-evaluation to produce identical ones would be complex.

If originally only OID 1234 had committed, there is a problem since there is no way to work out which of OID 4321 and OID 8765 corresponds to the unwritten OID 5678.

With labelling, the written information becomes, say, OID 1234/1 and OID 5678/2 (if both written). The re-evaluation generates, say, OID 4321/2 and OID 8765/1. It is now possible to see that the unwritten object corresponds to OID 4321. The contents of the regenerated OID 4321 can now be written with the correct OID of 5678. Further, if this was an instance of a relationship, any pointers held within OID 4321 to new objects can be correctly fixed up by translation via labels.

With regard to obtaining locks, it can be noted that all AUs have a (distributed) transaction started in parallel in which to perform locking and updating, although the ending of these transactions may force serialisation as required above.

All objects that are to be updated and that have been read during the evaluation, have their lock reserved and the object version checked to ensure that it has not been modified since. If it has, then the whole evaluation is rerun to take this change into account, thereby providing clean writes.

Any clean reads that have been requested by the evaluation are performed in the same way as clean writes. Again the evaluation can be rerun to take changes into account.

As to actually performing the update, any commit_time relative updates that have been made by the evaluation are then modified with the commit_time value obtained above. Typically, modifications will be from "commit_time" to top, not "evaluation_start_time" to top. The reason for this is that if the latter approach was taken, the commit would effectively be writing values from slightly in the past. Thus the evaluation allows "commit_time" relative values to be used when constructing updates. These have no usable value within the evaluation itself, but must be fixed up prior to writing. For example Person.wibble =commit_relative(+1 day)

If, as a result of finding the Atomic Units above, there is only a single one left, then the whole thing is committed as a single (distributed) transaction. For example, in the event of a single physical database being involved, this will always be the case. However, when more than one separate commitment unit is involved, there is both the possibility of failure and the need to deal with the lack of isolation.

Recovery from failure is based on the fact that the evaluations can be rerun in "exact" mode to generate exactly the same results as an initial evaluation. The commit can then be re-performed. There are two issues here, namely what is the secondary commit time, and what if there have been updates to objects in the meantime.

Firstly, it can be seen that the only sensible commit time on the rerun is that of the time of the rerun, not the original aborted commit. However, values that are fixed up to be "commit_relative" must be done in terms of the original commit time. The re-commit time is recorded in the session object as a time-versioned view of commit time.

Secondly, evaluations that have arisen between the original commit sequence commencing and recovery occurring, and have based their outcome on information "overwritten" during recovery, are just encountering an exaggerated interaction with the lack of isolation. If they have any long term interest in the information on which they based their decision, then such dependencies will be triggered when the recovery finally writes the values back in time.

If dependencies are not required to be maintained for the evaluation, then the session object can be discarded once it is known that the commit was successful, by an asynchronous process.

With regard to recovery from lack of isolation, the impact here is that a reader of information can see some of the updates of another evaluation, without seeing others from the same one. If it is crucial for system integrity that this can never occur, then the updates would have been performed in an AU, thus it is assumed that any relaxing on atomicity is done with the understanding that such isolation issues can occur, but their chance is low and post-event recovery is tolerable. These are in fact equivalent to "after-evaluation" dependencies discussed below.

Dependencies are used to track interaction between evaluations. There are two forms of this, namely interactions that actually occur during the evaluation, but are not noticed, and those that occur after evaluation. The second case has two flavours. Firstly an interaction that may have caused the original evaluation to have behaved differently if evaluated at the same point in time. Secondly an interaction that may cause the original evaluation to behave differently if evaluated at a later point in time.

There is one caveat to the ability of dependency tracking to spot interactions, namely the cost of detecting changes caused by the creation of new objects, as opposed to the modification of existing objects or the creation of new relationship instances, is high. This is because, in general, all existing locates on the particular object type would have to be, logically if not physically, re-performed.

For example, consider an evaluation that looks up a person by surname, "locate Person where surname="blorp". Whenever a new person was added to the system, a check would have to be made to see if it would have resulted in a different result set.

This is not to say support for this is impossible, indeed under normal circumstances, where new objects are always created from [now,top], the potential impact of this is minimal. The issue is with creation of objects in the past that may potentially impact huge numbers of dependencies.

How an evaluation indicates whether or not dependencies are maintained, and if so to what level and on what data (it is possible to maintain dependencies on subsets of an evaluation's data) is not discussed here.

During-evaluation Dependencies

While an evaluation is proceeding, updates can be made by, say OS2, to objects that have already been read by OS1. If these are not "clean" read then the evaluation will complete using the old values. Another way of looking at this is that if the evaluation were to rerun in review mode with the viewpoint set to the original evaluation's max_vp, then the outcome might differ.

The fact that this has happened can be detected after the event, by inspection of the session objects of the two interacting evaluations. Call these S1 and S2. Each of these contains information recording the session's max_vp and, for all objects that were read and are susceptible to time-skew problems, the object's LVT. It also contains one or more commit times (multiple if recovery occurred within the session). For each object updated by S1, if the same object occurs in the list of S2's read objects, and S1's commit time lies between S2's max_vp and the LVT of that object, then the dependency is triggered. Likewise a test is made on the relationships read and written. The opposite test must also be made, that of S2 affecting S1.

After-evaluation Dependencies

Unlike "during-evaluation" as discussed above, if the evaluation were run in review mode at exactly the same point in time, the same result would be achieved as the original run. However, if run in review or speculative mode with a viewpoint such that changes caused by the updating process were included, the outcome might differ.

This is very similar to the "during-evaluation" case above, except that potential interactions are tested for between max_vp and top (or some time point at which the dependency is deemed to expire) rather than max_vp and LVT.

When a dependency is triggered this means that a potential interaction between the evaluations has been spotted. The term "potential" here is used as the change in object state that caused the trigger may either be completely insignificant, for example, evaluation E1 uses O1.Surname and E2 updates O1.DateOfBirth, or effectively insignificant, for example, evaluation E1 tests O1.salary>10000 and E2 updates O1.salary from 500 to 700. Thus the first phase of trigger processing is to rerun the affected evaluation in either "review" mode or "speculative" mode, depending on whether the dependency is "during" or "after" evaluation. When the evaluation is complete, rather than committing the outcome, a test is made between the previous outcome and the current to see if they are effectively the same. If they are, then the dependency trigger processing is complete. Otherwise, the evaluation is passed to either a manual or automatic trigger processing business process, not discussed further herein.

Dependencies which are "during evaluation" only need to be kept for as long as they can possibly be triggered, which is final max_vp +maximum time skew. Thus by the time they are tested by the asynchronous process (asynchronous dependency processor), it is most likely that they can be discarded.

Dependencies which are "after-evaluation" can potentially exist forever. However, in reality their existence will most likely be scoped at least by the life of the business process within which they were created. Definition of exactly what subset, if any, of an evaluation's potential dependencies to track, and the lifetime of these, is not discussed further herein. Suffice to say, the underlying mechanisms required to support these will be based on the removal of object/relationship records from session objects.

With regard to non-transactable data sources, the approach to interaction with such sources, that is legacy systems, is to front them with shadow objects that capture the time varying nature of their values. This also allows reruns, as it provides isolation from both variance in nontime versioned legacy values and availability of the legacy systems themselves.

When such an object is read, the legacy data source is read and the values returned compared to those previously read/written, if there is such an existing record. It should be noted that there is an opportunity for optimisation here. If a recent value is available, then it may be possible to avoid the legacy read. If a value is read, then if it is different from the existing, or it is the first value, the value must be written to the equivalent object and committed prior to the evaluation commit. The value written is recorded as covering the period required, where no value is available, and [now,top].

The shadow read versions of the legacy values must be written in such that their new versions are visible to a rerun, that is their CreateTimes must be ≦ the rerun viewpoint. Other than this, they are written as any other update, locking and checking for updates etc.

If a new shadow object needs to be created then a sufficient level of locking needs to be used to ensure that two instances of the same shadow object cannot be created by the parallel activities.

The distributed object store/application environment software has the ability to support multiple independent views of an object. This is primarily to help during data migration, allowing an on-usage approach to cleansing data that does not match across systems but where identity can be determined. For example, a person's date of birth may be recorded on two legacy systems with different values.

Each such view of an object is called an "occurrence". To support locking within objects that have multiple occurrences, the first occurrence is distinguished and used to hold highest version information and the latest version creation time.

Figures 11, 12:
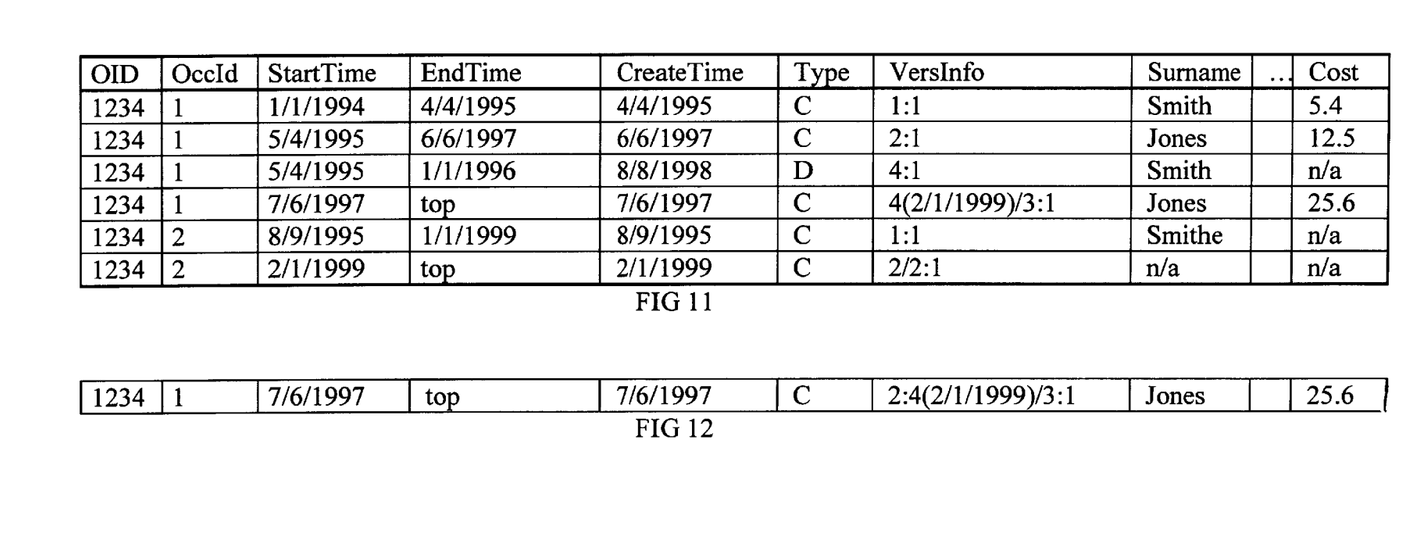
FIG. 11 is an example of the object of FIG. 6 with further information stored.
FIG. 12 is another example record.

Considering the example in FIG. 6 again, with two occurrences for this object the FIG. 11 record can arise. This shows two occurrences, with the difference being the spelling of "surname". This is then resolved. Note that occurrence 1 (OccId) manages the latest version creation time, even though this change was made to occurrence 2. Note also that the versions themselves are maintained on a per-occurrence basis.

One other piece of information is required, namely that of the number of occurrences within an object. Again, this is managed by the VersInfo field in occurrence 1. See FIG. 12. Here the prefix "2:" shows the number of occurrences. When creating a new occurrence this number is incremented. It should be noted that in the normal state of things, the latest version creation date will be the same as the CreateTime of the record that holds it, hence storage can be optimised.

Other algorithms detailed above to work with a single occurrence object are extended to deal with multiple occurrences, namely for "read", calculate LVT to be that of the highest occurrence, and for "locate", check completeness of versions for each occurrence.

The above description covers recovery from objects being updated in the period between an evaluation starting and being read, if clean reads are not required. However, the same mechanism can be extended to deal with longer term caches as long as the application can tolerate this. This is termed cross-evaluation caching.

The only issue is to ensure that the cache is consistent, as opposed to out of date. At the end of an evaluation, if the cache contains only the objects read/written in the evaluation, it is deemed to be consistent. It will consist of a set of objects, some denoting the "most recent" version of an object, namely those read with a viewpoint of "now" or written, and the rest denoting a specific version of an object read in the past. All of these denote completely valid cache entries for a particular viewpoint. However, the aim of the cache is to permit near-future interaction with the object store to read the current value to use the cached values. The reasoning behind this is that a chain of interactions between an object store instance and a user will tend to be operating on the same set of objects.

The challenge is to consistently maintain the current view of an object. Assume OS1 has read object O1 and cached the most recent version at this point. Then OS2 comes along and writes a new version to two objects, O1 and O2 as an atomic update. Now if OS1 runs again and only accesses O1, albeit out of date, this does not denote an inconsistent view of the object store. However, if it runs again, reads the cached O1 and then reads the uncached, and hence updated, O2, that is a different matter. To avoid this it is necessary to spot that O2 has a more recent version than that of the cached O1 and thus that the change that caused O2's new version to be written could also have changed other "current" objects with an older read time.

Whenever an object is read as "current", it will result in an LVT denoting the creation time of the most recent version of the object. All changes that can be made to this will result in a greater LVT, $LVT^1$, regardless of the clock-skew of the object store that performs it. Also, any changes to other objects at the same time by the object store, that is the set that the object is being maintained consistent with, will likewise be made with the same $LVT^1$.

The object is thus cached with the original LVT and marked as "current". Whenever an object is read from the object store during an evaluation its LVT, LVT2, is obtained. All other cached objects that are marked as current are now checked to see if their LVT is less than LVT2. If it is, then the cached object is marked as "exact", moving it from denoting the current view of an object to an exact view at its recorded LVT. If this cached object had already been used as "current" during the evaluation, then the evaluation is rerun.

Use of out of date cached objects across evaluations will be spotted and addressed by the dependency mechanism in exactly the same way as use of an out of date object within an evaluation.

In summary, and as will be appreciated from the above, the invention provides a mechanism for transaction control which maximises system performance under normal usage scenarios. It is, furthermore, always possible to effectively go back in time and re-run an evaluation and obtain exactly the same result as before. This is achieved by saving enough information to perform such a re-run. Since results can be regenerated, recovery from database failure is supported. Also provided is the ability to monitor the continuing validity of an evaluation's outcome. By managing the dependencies between information read, information written and the versions of data in the object store, it is possible to predict when to perform a re-evaluation to see if a previous outcome has been invalidated.

I claim:

1. A data processing apparatus comprising:
a plurality of user systems respectively including a plurality of object store instances, and at least one database accessible by said user systems, wherein the object store instances store time-versioned views of a plurality of objects as a plurality of records in said database, each of said records containing at least one attribute, a time span, a creation time, an object version marker, and a type field indicating whether said record is a concrete record or a delta record that modifies an attribute value of a previous record;

separate clocks for each of the object store instances;

means in each of the object store instances for performing an evaluation involving a particular object, relevant to a viewpoint time and time span; and means in each of the object store instances for employing a creation time of a most recent version of said particular object in a calculation to determine whether a time adjustment is required and whether said evaluation should be re-run in view of non-synchronization of the object store instances' clocks and clock-skew between the object store instances.

2. A data processing apparatus as claimed in claim 1, wherein a most recent concrete record for each of said objects has an end time corresponding to a hypothetical maximum time, with no delta record corresponding to any part of its time span; said data processing apparatus further including means for locking an object during updates to said object, using only said most recent concrete record for locking.

3. A data processing apparatus comprising:

a plurality of user systems respectively including a plurality of object store instances, and at least one database accessible by said user systems, wherein the object store instances store time-versioned views of a plurality of objects as a plurality of records in said database, each of said records containing at least one attribute, a time span, a creation time, and a type field indicating whether said record is a concrete record or a delta record;

means in each of the object store instances for accessing records relevant to a particular viewpoint time and time span; and recovery supporting means in each of the object store instances for storing a most recently used viewpoint time and time span together with a commit time as an instance of a session object, for linking the session object to an object identifying an object store instance, and for adding the session object to a relevant atomic unit.

4. A data processing method for use in a data processing system comprising at least one database and a plurality of user systems, the database being accessible by said user systems, and the user systems respectively including a plurality of object store instances having separate clocks, the method including:

storing time-versioned views of a plurality of objects as a plurality of records in said database, each of said records containing at least one attribute, a time span, a creation time, an object version marker, and a type field indicating whether said record is a concrete record or a delta record that modifies an attribute value of a previous record;

performing an evaluation involving a particular object, relevant to a viewpoint time and time span; and employing a creation time of a most recent version of said particular object in a calculation to determine whether a time adjustment is required and whether said evaluation should be re-run in view of non-synchronization of the object store instances' clocks and clock-skew between the object store instances.

5. A data processing method as claimed in claim 4, wherein a most recent concrete record for each of said objects has an end time corresponding to a hypothetical maximum time, with no delta record corresponding to any part of its time span, the method further including locking an object during updates to said object, using only said most recent concrete record for locking.

6. A data processing method for use in a data processing system comprising at least one database and a plurality of user systems, the database being accessible by said user systems, and the user systems respectively including a plurality of object store instances, the method including:

storing time-versioned views of a plurality of objects as a plurality of records in said database, each of said records containing at least one attribute, a time span, a creation time, and a type field indicating whether said record is a concrete record or a delta record;

accessing records relevant to a particular viewpoint time and time span; and supporting recovery by storing a most recently used viewpoint time and time span together with a commit time as an instance of a session object, linking the session object to an object identifying a particular object store instance, and adding the session object to a relevant atomic unit.

* * * * *